Oct. 7, 1958     P. P. KOZAK     2,855,232
RESILIENTLY MOUNTED BALL JOINT
Filed June 19, 1957
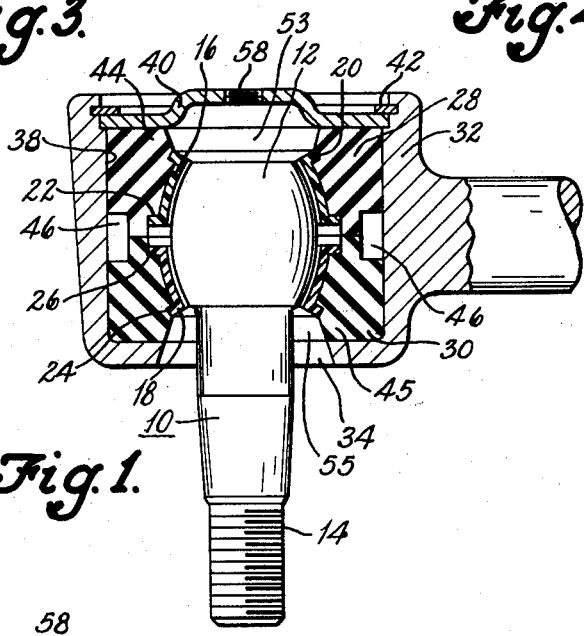

United States Patent Office 2,855,232
Patented Oct. 7, 1958

2,855,232

RESILIENTLY MOUNTED BALL JOINT

Peter P. Kozak, Dayton, Ohio, assignor to General Motors Corporation, Detroit, Mich., a corporation of Delaware Application June 19, 1957, Serial No. 666,608

4 Claims. (Cl. 287—85)

This invention relates to universal joints of the type having the ball end of a ball headed stud tiltably and rotatably supported within a socket member.

Among the objects of the invention is to provide a ball and joint assembly which is constructed so that the stud normally tends to assume a certain predetermined angular position relative to the plane of the socket from which the stud projects.

Another object of the invention is to provide a ball and joint assembly wherein a ball-like member having a greatest diameter and progressively lesser diameters toward each end thereof is supported within a complementary bearing shell which in turn is secured to and supported by an elastomeric bushing snugly held within a socket or housing whereby the ball member is readily rotatable with respect to the socket member along the longitudinal axis of the stud and is tiltable with respect to the socket through deformation of the bushing. A further object of the invention involves providing the bushing with an annular space adjacent the socket member wall preferably in the plane of the greatest diameter of the ball which permits the flow of rubber therein when a force is applied to tilt the stud whereby the degree to which the stud may be tilted and the ease of tilting the stud may be regulated.

The joint of the present invention is particularly useful in conection with certain automotive vehicle rear wheel suspensions wherein a link pivotally connects the rear housing to the frame by means of ball joints. In an installed position, a ball stud is fixed to the axle housing and to the frame in a position wherein the longitudinal axis of the studs are aligned with the transverse axis of the car body and in a horizontal position relative to the ground. A link is provided with a socket construction on each end thereof connecting the two ball studs. If the ball members are spherical as in conventional ball joints, the link would normally sag or tilt downwardly due to its weight until the studs engage the bushing of the socket openings through which the studs project. The ball joint of the present invention causes the link to be supported in a position substantially normal to the horizontal axis of a car and yet permits pivotal motion of the joint when a sufficient pivotal force is applied thereto.

Further objects and advantages of the present invention will be apparent from the following description, reference being had to the accompanying drawings wherein a preferred embodiment of the invention is clearly shown.

In the drawings:

Fig. 1 is an elevation view in partial cross section of a universal joint in a normal position embodying the present invention.

Fig. 2 is the joint of Fig. 1 showing the ball stud in a tilted position.

Figs. 3 and 4 are cross sectional views of bearing shells shown in perspective.

Referring to the drawings and in particular to Fig. 1, the joint of the present invention includes an inner-joint member 10 consisting of a ball-like member 12 integrally attached to a stud 14. As will be hereafter fully described, the ball-like member 12 has a generally barrel shaped configuration axially of the stud. The ball-like member 12 is snugly encased within a complementary bearing shell preferably consisting of an upper half shell 16 and a lower half shell 18. Preferably the upper half shell 16 includes a flange 20 at its smallest diameter end and a flange 22 at its largest diameter end, and similarly the lower half shell 18 includes a flange 24 at its smallest diameter end and a flange 26 at its largest diameter end. Desirably the half shells 16 and 18 are of a length such that when the half shells snugly embrace the ball-like member, a space is provided between the largest diameter ends or their respective flanges 22 and 26 so as to allow for wear take up between the bearing shells of the ball-like member during the use of the joint assembly. The bearing half shells 16 and 18 are supported within an elastomeric bushing preferably consisting of an upper portion 28 which supports the upper bearing half shell 16, and a lower portion 30 which supports the lower bearing half shell 18. The bushing is in turn supported within a socket or housing 32 having an opening 34 in the base thereof through which the stud 14 projects and in which the stud pivots to a desired degree. The socket 32 is preferably provided with a cup-like cavity having cylindrical walls 38 which snugly engage the bushing portions.

The bearing shells 16 and 18 are securely bonded to the respective bushing portions 28 and 30, and the flange portions 20 and 22 of the upper half 16 mechanically interlock with the inner surfaces of the bushing 28 and similarly the flange portions 24 and 26 of the lower half shell 18 mechanically interlock with the lower bushing portion 30 to insure that tiltable motion of the stud is accomplished through a deformation of the bushing.

In assembling the joint, the upper and lower bushing members 28 and 30 having the respective bearing shells secured thereto, are disposed about the ball-like member and the sub-assembly is inserted into the socket cavity. The bushing members are snugly retained within the socket cavity by means of a closure plate 40 and a retaining ring 42 in an obvious maner. The bushing members are preferably retained within the socket cavity under slightly loaded conditions so as to insure that the bearing shells at all times snugly engage the ball-like member.

As a consequence of the above construction, the ball-like member is free to rotate within the bearing shells along the longitudinal axis of the stud 14 but may not tilt or pivot with respect thereto. As is shown in Fig. 2, tiltable or pivotal movement is effected through a deformation of the bushing members. To facilitate deformation of the elastomeric bushing, a substantial mass of elastomeric material 44 and 45 respectively is provided between the smallest diameter end of the bearing shell 16 and the top of the socket or closure cap 40 and between the smallest diameter end of the bearing shell 18 and the lower end or base of the socket. Further, an annular space 46 is provided, preferably adjacent the socket wall, in the plane of the greatest diameter of the ball member, to allow for the flow of the elastomeric material of the housing therein and to more readily permit deformation of the bushing as is illustrated in Fig. 2 wherein the shaft member is shown tilted with an attending flow of elastomeric material 47 and 48 into the annular space 46 and of the elastomeric material 50 and 52 into the space 53 provided above and the space 55 provided below the ball-like member 12, respectively. It is readily apparent that the ease of deformation of the elastomeric bushing may be regulated by a variation in the size of the annular space 46 and by a variation of the elastomeric mass between the smallest diameter end of the bearing shell 16 and the closure cap 40 and between the smallest diameter end of the bearing shell 18 and the base of the socket.

As is shown in the drawings, the axial section of the inner-joint member 12 preferably has a longitudinal convex curvature which has a radius of curvature that is substantially greater than the semi-diameter thereof so that the inner-joint member is substantially barrel shaped and capable only of rotational movement within the complementary bearing shells having a substantially identical inner configuration. Other shapes of a barrel-like character may be used as for example, a suitable frustum of a spheroid, ellipsoid or spindle which will provide a maximum bearing surface and yet will not permit the inner-joint member to pivot with respect to the complementary bearing shells. By this arrangement, a maximum area of surface contact is obtained between the bearing shells, the elastomeric bushing and the inner-joint member.

To avoid the tendency of binding between the inner-joint member and the bearing shells when the joint is subjected to forces causing a pivotal action, the bearing shells are preferably provided with a plurality of inner annular ribs 54 as shown in Fig. 3 in exaggerated form or with a plurality of projections 56 as shown in Fig. 4 in exaggerated form.

The closure plate 40 of the joint assembly is provided with a threaded opening 58 for receiving a suitable lubricant fixture through which lubricant is supplied to the space 53. In this connection, the bearing shell structure of Figs. 3 and 4 has the added advantage of permitting lubricant to flow into the interface of the bearing shells and the inner-joint member. To prevent the entry of deleterious substances into the joint and retain the lubricant therein, a suitable seal (not shown) is disposed about the stud 14 which engages the base of the housing member 32 as is well known in the art.

By the term elastomeric is meant a relatively soft rubber-like substance such as natural rubber, butadiene-styrene copolymer, butadiene-acrylonitrile copolymer, polychloroprene, polysulfide rubbers and mixtures of these and similar rubbery materials.

While the embodiments of the present invention as herein disclosed constitute a preferred form, it is to be understood that other forms might be adopted.

What is claimed is as follows:

1. A joint construction comprising, in combination, a ball-like member attached to a shaft and having a substantially barrel-shaped configuration in an axial direction, a socket receiving said ball-like member in spaced relation, a bearing shell encasing said ball-like member, and an elastomeric bushing snugly interposed between said bearing shell and said socket, said bearing shell being secured to said elastomeric bushing, said bearing shell having an internal configuration complementary to the configuration of the ball-like member whereby the ball-like member is rotatable only with respect to the bearing shell along the longitudinal axis of said shaft and tiltable motion is effected through the deformation of said elastomeric bushing.

2. In a joint construction, an inner-joint member attached to a shaft and having a convex bearing face, said convex bearing face being generated by the rotation of a curvilinear line about the axis of said inner-joint member, the radius of curvature of said curvilinear line being considerably greater than the greatest distance of the latter from the axis of said inner-joint member; an outer-joint member surrounding said inner-joint member in spaced relation, a bearing shell surrounding said inner-joint member and having a concave bearing face complementary to the convex bearing face of said inner-joint member; and a deformation bushing snugly disposed between said bearing shell and said outer member, said deformation bushing being secured to the said bearing shell, said inner-joint member being capable of tiltable motion only through deformation of said bushing.

3. A joint construction comprising, in combination, a ball-like member attached to a shaft, a socket receiving said ball-like member in spaced relation, a bearing shell encasing said ball-like member, and an elastomeric bushing snugly interposed between said bearing shell and said socket, said bearing shell being secured to said elastomeric bushing, said ball-like member being rotatable only with respect to said bearing shell, said ball-like member being tiltable with respect to said socket through deformation of said elastomeric bushing.

4. A joint construction comprising, in combination, a ball-like member having a convex curvilinear configuration, a bearing shell encasing said ball-like member comprising upper and lower half shells, said ball-like member being only rotatable with respect to said bearing shell, an elastomeric bushing comprising upper and lower portions encasing said upper and lower bearing half shells respectively and being secured thereto, and a socket snugly containing said bushing, said bearing half shells being supported by said bushing in spaced relation.

References Cited in the file of this patent

UNITED STATES PATENTS

| | | |
|---|---|---|
| 1,940,895 | Wacker | Dec. 26, 1933 |
| 1,989,116 | Strauss | Jan. 29, 1935 |
| 2,361,025 | Graham et al. | Oct. 24, 1944 |
| 2,417,160 | Graham | Mar. 11, 1947 |
| 2,424,431 | Booth | July 22, 1947 |
| 2,424,455 | Graham et al. | July 22, 1947 |
| 2,425,138 | Venditty | Aug. 5, 1947 |
| 2,537,629 | Brown | Jan. 9, 1951 |
| 2,740,649 | Latzen | Apr. 3, 1956 |